Oct. 13, 1959

W. E. ALTMANN 2,908,366

SYNCHRONIZING CLUTCH

Filed Jan. 23, 1956

INVENTOR
WERNER E. ALTMANN

BY *Dicke and Craig*

ATTORNEYS.

Oct. 13, 1959    W. E. ALTMANN    2,908,366
SYNCHRONIZING CLUTCH

Filed Jan. 23, 1956    2 Sheets-Sheet 2

INVENTOR
WERNER E. ALTMANN

BY  Dicke and Craig.

ATTORNEYS

United States Patent Office 2,908,366
Patented Oct. 13, 1959

2,908,366
SYNCHRONIZING CLUTCH

Werner E. Altmann, Stuttgart, Germany, assignor to Daimler-Benz Aktiengesellschaft, Stuttgart-Unterturkheim, Germany Application January 23, 1956, Serial No. 560,601

Claims priority, application Germany February 2, 1955

8 Claims. (Cl. 192—53)

The present invention relates to a new and improved jaw clutch for automobiles and similar vehicles and to means to facilitate the engagement of the members of such a clutch. More particularly, the invention relates to a synchronizing mechanism of the type in which a synchronizing and locking element is interposed between the two clutch members and connected with one of them so as to be rotatable therewith to a limited extent. Such synchronizing element is adapted to be engaged with the other clutch member by friction, and it permits both clutch members to be engaged only in one particular rotary position of such element relative to the clutch member of limited rotatability.

It is an object of the present invention to provide a clutch of the type as described in which the synchronizing mechanism includes a pair of coaxial ring-shaped members and jaw members which are disposed intermediate the two rings in a manner similar to spokes.

Another object of the invention is to make the pin-shaped jaws and the two ring-shaped members integral with each other and preferably of a single piece of material.

The present invention affords considerable advantages over clutches of a similar type as previously proposed, in that the pin-shaped jaws, as seen in a radial direction, are secured at both sides by a ring-shaped member, and the entire slidable clutch member will thus form a single and very solid unit which may be securely connected to the associated shaft solely by splines or similar means which are provided on the inner ring.

Also as seen from the standpoint of its manufacture, the new clutch design has a considerable advantage over those previously proposed. Whereas pin-shaped jaws as previously suggested could not be made of one piece of material and had to be made separately and then had to be inserted in the ring-shaped member, the present invention permits such jaws to be easily made as an integral part of the rings, thus resulting in a very rigid structure.

It is another object of the invention to make the slidable clutch member as narrow as possible so as to reduce the axial length of the synchronizing mechanism.

A further object of the invention is to provide the slidable clutch member in the form of two symmetrical rings or disks which are small enough so as to be easily punched out. Also, it is then possible to shape and fit the pin-shaped jaws more accurately, and to insert between the two disks a spring ring which may be used to transmit the axial movement of the slidable clutch member to the locking and synchronizing element.

Further objects, features, and advantages of the present invention will appear from the following detailed description thereof, as well as from the accompanying drawings, in which—

Fig. 4 shows a front view of the adjustable jaw clutch member; while

Fig. 4a shows a cross section through one jaw element of the adjustable clutch member, as taken along line IVa—IVa of Fig. 4.

Figure 1:
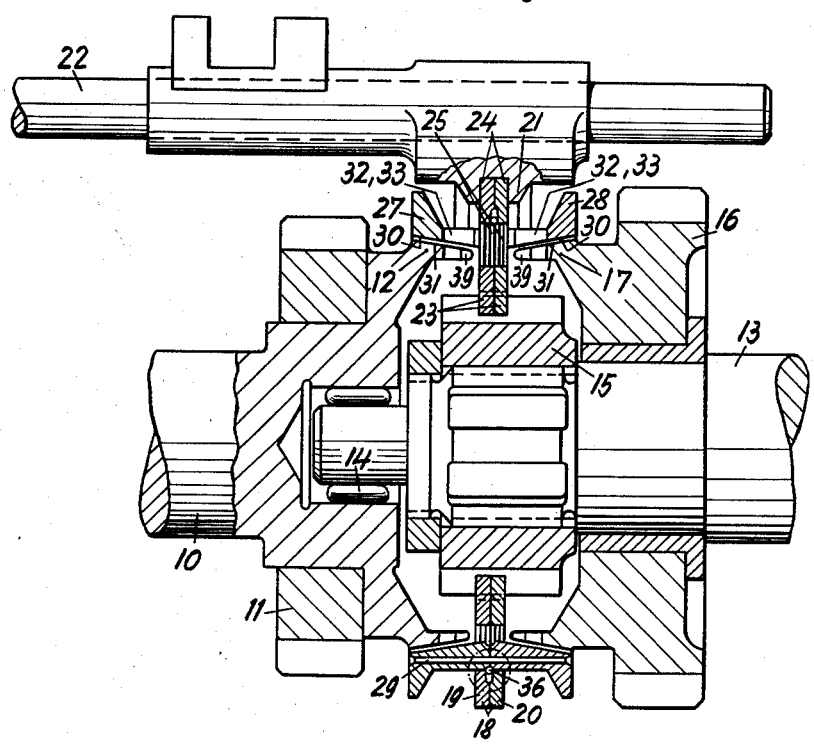
Fig. 1 shows a longitudinal section through a clutch and a synchronizing mechanism according to the invention.

Referring to the drawings, Fig. 1 shows the drive shaft 10 of the new clutch with a gear 11 rigidly mounted thereon which terminates at its forward end in a clutch member 12. The driven shaft 13 is rotatably mounted by means of a needle bearing 14 within a socket-like recess in the end of drive shaft 10, and carries an intermediate member 15 which is rigidly mounted thereon for supporting a plate-like axially slidable clutch member 18. Shaft 13 also carries a gear 16 which is rotatably but non-slidably mounted thereon and carries integrally therewith a second clutch member 17 which is adapted to be engaged with clutch member 18. Gears 11 and 16 are in engagement with the gears of a gear system as usually provided in automobiles which are therefore not specifically illustrated in the drawings.

Figure 4:
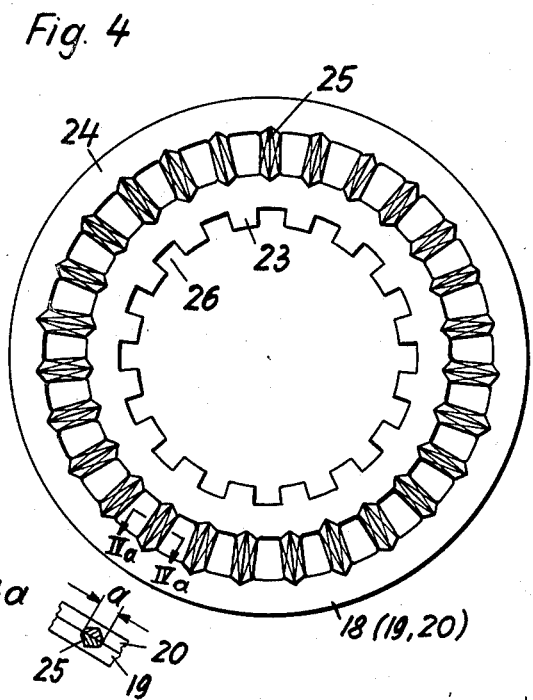

The intermediate supporting member 15 carries the slidable clutch member 18, as shown particularly in Fig. 4. It consists of two symmetrical flat rings 19 and 20 which are held together by a bifurcated member 21, and are shifted along a stationary rod 22 which is mounted in the gear housing. More specifically, clutch member 18 consists of two rings 23 and 24 between which pin-shaped jaw elements 25 are provided which are pointed at both sides in axial direction, as shown in Fig. 4a in order to engage with corresponding jaw elements. Ring 23 is provided with splines 26 by means of which clutch member 18 is slidably but non-rotatably connected with supporting member 15.

Figure 3:
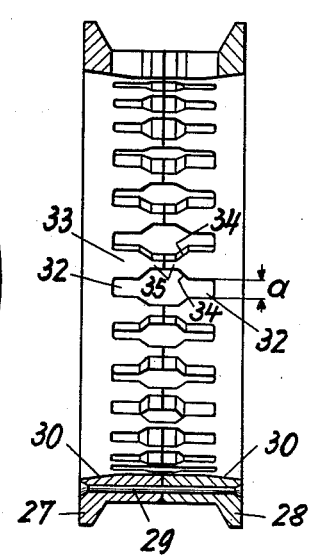
Fig. 3 shows a cross section through the locking and synchronizing element.

For synchronizing the rotation of clutch members 12 and 17 and gears 11 and 16, respectively, the present invention provides a synchronizing and locking member which consists of two symmetrical rings 27 and 28 which are secured to each other, for example, by rivets 29, as shown in Fig. 3. Rings 27 and 28 are provided with conical inner peripheral surfaces 30 which are inclined in opposite directions and adapted to engage by friction with corresponding conical surfaces 31 on clutch members 12 and 17 respectively. By providing a series of slots 32 in the portion of the connected rings 27 and 28 which axially faces toward the central transverse plane of symmetry, a series of axially projecting jaw-like teeth 33 are formed. The projecting ends of teeth 33 are first outwardly convergently inclined at both sides at 34 and then again continue in an axial direction at 35. The blunt ends of tooth portions 35 of rings 27 and 28 abut against each other and are secured together in such a position by rivets 29. When assembled, the pin-shaped jaws 25 of the slidable clutch member 18 extend through the recesses which are formed in the synchronizing and locking member 27, 28 by teeth 33. Jaws 25 have a width $a$, as shown in Figs. 3 and 4a, which is substantially equal to that of slots 32 so as to fit slidably into these slots.

Figure 1A:
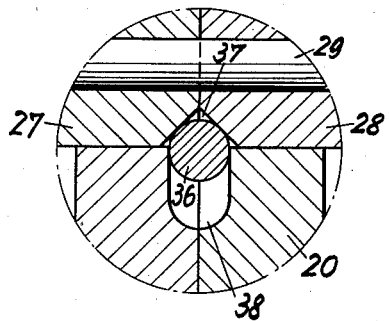
Fig. 1a shows a specific detail of Fig. 1 on an enlarged scale.
Figure 2:
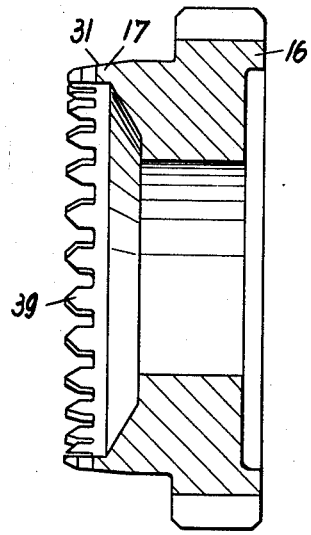
Fig. 2 shows a cross section through the gear which is mounted on the driven shaft.

The synchronizing and locking member 27, 28 is connected with the slidable clutch member 18 by means of a spring ring 36, as shown particularly in Fig. 1a, which rests in a groove 37 at the line of separation between rings 27 and 28 and exerts its spring action in an inward direction but is capable of moving outwardly into an annular groove 38 between rings 19 and 20 of the slidable clutch member 18.

The pinshaped jaws 25 of the slidable clutch member 18, as seen in a radial direction, are of a length so as to extend not only between teeth 33 of the synchronizing and locking member 27, 28, but also between the toothlike jaws 39 of clutch members 12 and 17, respectively.

The operation of the new synchronizing mechanism is as follows:

Fig. 1 illustrates the jaw clutch in its central neutral or disengaged position with the slidable clutch member 18 being disposed within the central transverse plane of symmetry of the clutch. In such a position, the synchronizing and locking member 27, 28 is freely rotatable without friction relative to the nonslidable clutch members 12 and 17, and the inner or central parts 35 of its teeth 33 freely engage within the clearances between the pinshaped jaws 25 of the slidable clutch member 18 and limit the rotation of the locking member relative to the clutch member 18.

For coupling the driven shaft 13 with the drive shaft 10, the bifurcated member 21 is shifted toward the left on rod 22, thereby also shifting clutch member 18 toward the left. The immediate result of such shifting movement is that spring ring 36 will shift the synchronizing and locking member 27, 28 so that conical surface 30 thereof will engage with the corresponding surface 31 of clutch member 12 and thus produce a frictional connection of member 27, 28 with driving shaft 10. The latter will therefore take along and rotate member 27, 28 until the pinshaped jaws 25 abut against tooth portions 35. If clutch member 18 is then further shifted toward the left, the inclined surfaces of jaws 25 will engage with the inclined surfaces 34 of teeth 33. Since a large torsional moment will now be transmitted between the slidable clutch member 18 and the synchronizing and locking member 27, 28, there will be no further axial sliding movement of jaws 28 until members 18 and 27, 28, and thus shafts 10 and 13, will run in synchronism. Clutch member 18 may then be further shifted in axial direction so as to effect the small relative rotation between clutch member 18 and member 27, 28 whereby jaws 25 will slide into slots 32. Since at the same time jaws 25 will enter between teeth or jaw elements 39 of clutch member 12, shafts 10 and 13 will then also be in positive engagement with each other.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A jaw clutch comprising, in combination, a pair of coaxial rotatable clutch members for engaging the gears of a variable gear transmission, one of said clutch members being axially slidable, synchronizing means for synchronizing the rotation of said clutch members comprising said axially slidable member which includes a pair of coaxial ring-shaped members, a plurality of radially directed pin-shaped jaw elements connected to and disposed intermediate said ring-shaped members in a spoke-like formation, a locking member including means connected with the axially slidable clutch member so as only to permit a limited rotary movement of said locking member relative to said axially slidable member, and means on said locking member for frictionally engaging said locking member with the other clutch member and for blocking engagement of said clutch members during relative rotation thereof and permitting the engagement of said jaw elements with the other clutch member only at a certain rotary position of said locking member relative to said axially slidable member, said slidable member comprising a pair of annular disks, each of said disks containing one-half of each of said pin-shaped jaw elements, and a bifurcated member partly embracing said two disks for holding them together, and means for shifting said bifurcated member in a direction parallel to the axis of said clutch members for thus shifting said disks.

2. A jaw clutch as defined in claim 1, further comprising a spring ring connected intermediate said slidable member and said locking member for transmitting the axial movement of said slidable clutch member to said locking member.

3. A jaw clutch comprising, in combination, a pair of coaxial rotatable clutch members having mutually engageable jaw elements, one of said members being axially slidable and including a pair of radially spaced concentric rings, the jaw elements of said one member being a plurality of radial pin-shaped elements connecting said rings in a spoke-like formation, means for synchronizing rotation of said clutch members comprising a locking member including means inter-engaged with said radial elements for rotation therewith and having limited rotation with respect thereto, said pin-shaped elements having means thereon cooperating with said last-mentioned means and for facilitating engagement thereof with the jaw elements of the other clutch member, means on said locking member for frictionally engaging the other clutch member, said locking member having means engageable with said radial elements of said one clutch member and defining limits for rotation of said locking member relative thereto, said last-mentioned means permitting engagement of the jaw elements of said clutch members only at a certain rotary position of said locking member relative said one clutch member and preventing said engagement when said clutch members are not synchronized.

4. A jaw clutch as defined in claim 3, wherein said axially slidable clutch member is a flat plate-like structure having a plurality of openings defined by said rings and said radial elements.

5. A jaw clutch as defined in claim 4, further comprising a third rotatable clutch member coaxial with said pair of members, said third member having jaw elements engageable with the jaw elements of said axially slidable member, said locking member having further means for frictionally engaging said third clutch member, said locking member preventing engagement of the jaw elements of said slidable member and said third clutch member except when they are synchronized, and means for selectively moving said slidable clutch member and said locking member into engagement with one or the other of said other clutch member and said third clutch member.

6. A jaw clutch comprising, in combination, a pair of coaxial rotatable clutch members having mutually engageable jaw elements, synchronizing means for synchronizing the rotation of said clutch members comprising an axially slidable member including radially spaced concentric ring members, a plurality of radial pin-shaped jaw elements connected to and disposed intermediate said ring members in a spoke-like formation, a locking member having means engageable with said jaw elements connected with said axially slidable member and being rotatable therewith and having limited rotary movement relative thereto, means on said locking member for frictionally engaging the locking member with one of said clutch members and for blocking engagement of said clutch members during relative rotation thereof and permitting engagement of said jaw elements only at a certain rotary position of said locking member relative to said axially slidable member, said slidable member comprising a pair of discs, each of said discs containing one-half of each of said radial pin-shaped jaw elements.

7. A jaw clutch as defined in claim 6, wherein said locking member comprises two ring-like members having teeth projecting intermediate said radial jaw elements and cooperating therewith to provide synchronization of said rotatable clutch members.

8. A jaw clutch comprising, in combination, first and second coaxially-rotatable mutually-engageable clutch members each having a plurality of jaw elements, means for supporting said clutch members for relative axial movement between engaged and disengaged positions, synchronizing means including a locking member supported for rotation with, and for limited rotation with respect to, the first clutch member, the second clutch member having axially projecting jaws, the first clutch member being generally a flat disk-like structure having its jaws extending radially to provide at a first distance from its axis first portions of its jaws engageable with the axially projecting jaws of the other clutch member and second portions of the same jaws at another radial distance from said axis for engagement with said locking member, said locking member including surfaces engageable with said second jaw portions to define the limits of rotation of said locking member relative to said first clutch member when the clutch members are disengaged and to prevent engagement of the clutch members when said locking member is moved to a predetermined position relative to said one clutch member, said locking member and the second clutch member having mutually engageable friction surfaces whereby, upon attempted engagement of said clutch members during asynchronous rotation thereof, said friction surfaces are engaged and said locking member is moved to said predetermined position to prevent interengagement of the jaws of said clutch members, and means for actuating said locking member and said first clutch member into engagement with the second clutch member.

References Cited in the file of this patent

UNITED STATES PATENTS

| | | |
|---|---|---|
| 2,131,199 | Tenney | Sept. 27, 1938 |
| 2,256,308 | Bixby et al. | Sept. 16, 1941 |
| 2,392,520 | Benz et al. | Jan. 8, 1946 |